United States Patent [19]

Nielinger et al.

[11] Patent Number: 5,115,050
[45] Date of Patent: May 19, 1992

[54] POLYAMIDE MOULDING COMPOSITIONS CONTAINING FINELY DIVIDED POLYARYLENE SULPHIDES

[75] Inventors: Werner Nielinger; Karsten-Josef Idel, both of Krefeld; Uwe Westeppe, Mettmann; Dieter Freitag, Krefeld; Claus Wulff, Krefeld; Hans-Detlef Heinz, Krefeld, all of Fed. Rep. of Germany

[73] Assignee: Bayer Aktiengesellschaft, Leverkusen, Fed. Rep. of Germany

[21] Appl. No.: 513,072

[22] Filed: Apr. 23, 1990

[30] Foreign Application Priority Data

May 4, 1989 [DE] Fed. Rep. of Germany ....... 3914715

[51] Int. Cl.$^5$ .................... C08F 283/00; C08L 81/00
[52] U.S. Cl. .................................... 525/537; 525/420
[58] Field of Search ................. 525/537, 420

[56] References Cited

U.S. PATENT DOCUMENTS

| 4,292,416 | 9/1981 | Shue | 525/420 |
| 4,528,335 | 7/1985 | Selby et al. | 525/420 |
| 4,760,109 | 7/1988 | Chiba | 525/537 |

FOREIGN PATENT DOCUMENTS

88/02763 4/1988 PCT Int'l Appl.

*Primary Examiner*—John C. Bleutge
*Assistant Examiner*—Helen F. Lee
*Attorney, Agent, or Firm*—Connolly and Hutz

[57] ABSTRACT

The invention relates to a process for the preparation of polyamide moulding compositions containing 0.1 to 40 wt. % of a polyarylene sulphide by reaction of polyamide-forming components in the presence of polyarylene sulphides.

5 Claims, No Drawings

POLYAMIDE MOULDING COMPOSITIONS CONTAINING FINELY DIVIDED POLYARYLENE SULPHIDES

The invention relates to a process for the preparation of polyamide moulding compositions containing 0.1 to 40 wt. % of a polyarylene sulphide by reaction of polyamide-forming components in the presence of polyarylene sulphides.

Because of a number of outstanding properties, such as toughness, rigidity, abrasion resistance and hardness, polyamides are employed inter alia for the production of mouldings for the industrial sector by injection moulding or extrusion. In order to extend the possible uses of polyamides and to improve specific properties further, mixtures with other polymers have also been prepared. Thus, for example, it is possible to increase the toughness at low temperatures and the flexibility by adding mixtures basd on polyolefins, poly(meth)acrylates or polybutadienes.

However, mixtures of polyamides with other polymers only achieve optimum values of their properties and a smooth and uniformly developed appearance of the surfaces if it is possible to improve the compatibility of the polyamide with the modifier, for example by incorporation of carboxyl, anhydride or ester groups. The development of specific modifiers, preparation of which requires effort and is expensive, is required for this. However, some of the properties of the polyamide mixtures of improved compatibility are also often below the level of the starting polyamides. Thus, polyamides modified in their impact strength have a lower heat distortion temperature, a lower modulus and poorer flow properties.

Mixtures of polyamides (from diamines branched with terephthalic acid) and 0.01 to 10.0 wt. % polyarylene sulphide have been described in U.S. Pat. No. 4,292,416, and mixtures of polyamide 46 and 5 to 50 wt. % polyarylene sulphide have furthermore been described in the patent application WO 86/03 212. These mixtures are prepared by mixing the polyamide and polyarylene sulphide polymers in the melt by customary methods, for example in an extruder. Although a few advantageous measures for the preparation of homogeneous blends are already mentioned in these patent specifications, in particular use of the polyarylene sulphide as a powder and compounding of the components above the melting temperature of the polyarylene sulphide, or addition of the polyarylene sulphide in dissolved form, the particle size of the polyarylene sulphide in the mixtures varies and the distribution is non-uniform. The mixtures of polyamide 6 and polyarylene sulphide, according to the data of the patent application WO 86/03 212, therefore also have a poor appearance, a low strength and rigidity and irregular extrusion behaviour, and are replaced there by 4,6-PA.

Surprisingly, it has now been found that the disadvantages described can be avoided if the polyamide-forming monomers are polymerized with addition of the polyarylene sulphide.

The invention thus relates to a process for the preparation of mixtures of polyamides and polyarylene sulphides with a particle size of the polyarylene sulphide of 0.05 to 5 μm, preferably 0.1 to 4 μm, by polymerizing the polyamide-forming monomers with addition of the polyarylene sulphide.

Suitable polyamide-forming monomers are diamines, such as diaminobutane, 1,6-diaminohexane, 2,2,4- and 2,4,4-trimethylhexamethylenediamine, 1,4-diaminocyclohexane, bis-(aminomethyl)-cyclohexane, bis-(4-aminocyclohexyl)methane, bis-(4-aminocyclohexyl)-propane, 3,3'-dimethyl-4,4'-diamino-dicyclohexylmethane, 3-aminomethyl-3,3,5-trimethyl-cyclohexylamine and m- or p-xylylenediamine, and furthermore dicarboxylic acids, such as adipic acid, azelaic acid, sebacic acid, decanedicarboxylic acid, trimethyladipic acid, hexahydroterephthalic acid, isophthalic acid and terephthalic acid, and furthermore aminocarboxylic acids or their lactams. Mixtures of several of these starting substances are of course also possible.

Possible polyarylene sulphides are products with identical or different arylene sulphide units of the formula (I)

$$-Ar-S-\quad (I)$$

in which

Ar represents a radical of the formula (II) to (IV)

(II)

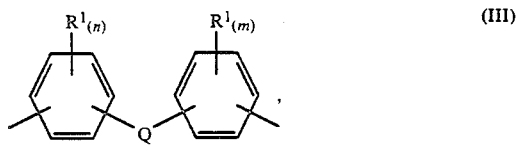

(III)

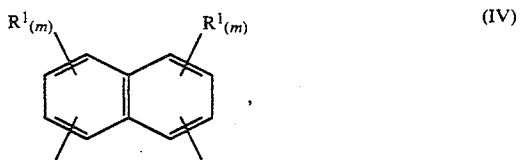

(IV)

in which $R^1$ is identical or different and can be hydrogen, $C_1$-$C_4$-alkyl, $C_5$-$C_{10}$-cycloalkyl, $C_6$-$C_{10}$-aryl, $C_7$-$C_{14}$-alkylaryl or $C_7$-$C_{14}$-arylalkyl, it being possible for two radicals $R^1$ in the ortho position relative to one another to be linked, incorporating the adjacent C atoms in the ring, to form a $C_5$-$C_{14}$-aromatic ring or a heterocyclic ring containing up to three hetero atoms, such as N, O o S, and Q represents a single bond or a group such as $-CR^1{}_2-$, $-C(O)-$, $-S(O)-$, $-S(O)_2-$, $-NR^1-$, $-C(C)O-$, $-C(O)NR^1-$, $(-C(O))-_2N-$, $-C(O)NR^1-Ar-$ $NR^1(CO(O)-$ or $-C(O)-Ar-C(O)-$, wherein $R^1$ and Ar have the abovementioned meaning, n represents the number 1, 2, 3 or 4 and m represents the number 1, 2 or 3.

The melt viscosity of the polyarylene sulphide is 10-150 Pa.s preferably 15-60 Pa.s, measured at 310° C. in a high pressure capillary viscosimeter at a shearing velocity of 1000 s$^{-1}$.

The mixtures are prepared by polymerization of the polyamide-forming monomers in a known manner with addition of the polyarylene sulphide. Diamines and dicarboxylic acids are advantageously employed as salts in aqueous solution. The solution is first subject to preliminary condensation at about 200° to 240° C. under increased pressure. After letting down, further condensation is carried out under atmospheric pressure at about 260° to 300° C. Lactams, in particular ε-caprolactam, are polymerized either hydrolytically or anionically, if appropriate with addition of an activator. The anionic polymerization can also be carried out in the presence of glass fibres or glass mats.

In the process of hydrolytical polymerization of higher quantities of caprolactam in an autoclave, it is very preferred to first heat the mixture of ε-caprolactam and the polyarylene sulphide to 270°–280° C., preferably 275°–280° C. during a period of 30 minutes and then to run the polymerisation after cooling the mixture to 260° to 270° as to finish the polymerisation reaction.

A particularly advantageous embodiment of the process is the preparation of mixtures of polyamide 6 and polyarylene sulphide by first dissolving the polyarylene sulphide in ε-caprolactam at temperatures above 240° C. and polymerizing this solution hydrolytically or anionically, if appropriate with addition of an activator.

The mixtures according to the invention can contain the customary additives and auxiliaries, for example lubricating and mould release agents, nucleating agents, flameproofing agents and other fillers. Possible fillers are glass micro-beads, chalk, quartzes, such as novaculite, and furthermore silicates, such as asbestos, feldspar, mica, talc and kaolin, in calcined and non-calcined form. There may also be mentioned dyestuffs and pigments, and furthermore impact strength modifiers, for example based on copolymers of ethylene or grafted rubbe latices, for example based on polybutadiene or poly(meth)acrylate.

The polyamide mixtures are distinguished by a good and uniform distribution of the polyarylene sulphide in the polyamide matrix. The diameter of the spherical particles in 0.01 to 5 μm, preferably 0.05 to 3 μm. The structural properties of the polyamide are scarcely influenced by the polyarylene sulphide. Although the toughness decreases, the heat distortion temperature remains at the level of the polyamide, whereas the rigidity even increases further and the processing properties (flowability) increase.

The mixtures according to the invention can thus be employed e.g. for the production of industrial components, in particular for the car sector.

EXAMPLE 1

30 g polyparaphenylene sulphide[1]) are dissolved in 243 g ε-caprolactam at 250° C. under nitrogen. The solution is cooled and, after addition of 31.3 g ε-aminocaproic acid, polymerization is carried out hydrolytically at 270° C. in a nitrogen atmosphere for 2½ hours, while stirring. During the polymerization, the melt becomes cloudy. An almost colourless product is obtained and is granulated and extracted three times with water at 90° C. for eight hours each time.

The relative viscosity of the polyamide content in the mixture is 3.1, measured on a one per cent solution in m-cresol at 25° C. in a Ubbelohde viscometer.

EXAMPLE 2

Example 1 is repeated with the following changed proportions:
198 g ε-caprolactam
75 g poly-(p-phenylene sulphide)
31.3 g ε-aminoaproic acid, added after the poly-(p-phenylene sulphide) has dissolved.

The relative viscosity of the polyamide content is 2.8.

The properties of the products from examples 1 and 2 are summarized in table 1.

The polyparaphenylene sulphide used in this and the following examples has a melt viscosity of 42 Pa.s/310° C./100 sec$^{-1}$.

EXAMPLE 3

7018 g of ε-caprolactam, 559 g ε-aminocapronic acid and 2500 g of polyparaphenylenesulphide are heated under stirring in a nitrogenatmosphere in an autoclave to 275°–278° C. for 30 minutes. Then the temperature in the melt is reduced to 269° C. and the mixture is polymerized for another 120 minutes.

The polyamide melt is spun as usually, is cooled in a waterbath and then cut to a granulate. This granulate is then extracted three times with 90° C. hot, fresh water and thereafter dried.

The polyamide part has a relative viscosity of 3,3 (m-cresol/25° C./1% solution). Properties see Table 1.

TABLE 1

| | Example 1 | Example 2 | Example 3 | Polyamide 6 (Comparison) |
|---|---|---|---|---|
| Distribution | ←—very uniform—→ | | | — |
| Particle size μm | 0.1–0.8 | 0.1–2 | 0.02–1 | — |
| Limit flexural stress mPa | 116 | 124 | 128 | 112 |
| Flexural E modulus mPa | 2.690 | 2.871 | 3.200 | 2.590 |
| Izod impact strength kj/m$^2$ | 67 | 25 | — | — |
| Vicat softening temperature VST B °C. | 206 | 208 | 208 | 202 |
| Water uptake (saturation) % | 6.9 | | 6.7 | 10 |

EXAMPLE 4

313 g salt of adipic acid and hexamethylenediamine, 5.6 g hexamethylenediamine (as compensation for diamine distilled off) and 30 g poly-(p-phenylene sulphide) are initially heated at 240° in a nitrogen atmosphere, while stirring. The solidified melt is heated to 280° C., whereupon the product melts again. Further polycondensation is carried out at this temperature for one hour. An almost colourless mixture with a relative viscosity of 2.8 is obtained.

The mechanical properties of the products can be seen from the following table 2.

TABLE 2

| | Example 4 | Polyamide 66 (comparison) |
|---|---|---|
| Distribution | uniform | — |
| Particle size μm | 0.2–2.5 | — |
| Limit flexural stress mPa | 129 | 125 |
| Flexural E modulus mPa | 3.005 | 2.800 |
| Izod impact strength kj/m$^2$ | 41 | — |
| Vicat softening temperature VST B °C. | 243 | 245 |
| Heat distortion temperature | | |
| ISO R 75 meth. a °C. | 78 | 74 |
| ISO R 75 meth. b °C. | 190 | 225 |

EXAMPLE 5

226 g salt of adipic acid and hexamethylenediamine, 120.4 g salt of terephthalic acid and hexamethylenediamine, in addition an excess of 6 g hexamethylenediamine and 33.3 g poly-(p-phenylene sulphide) are initially heated at 250° C. for 60 minutes, whereupon the mixture partly melts, but then becomes solid again, and then at 300° C. for a further hour. An almost colourless product with a viscosity of 2.7 and the following properties is obtained:

TABLE 3

|  | Example 5 | Polyamide 66/6T |
|---|---|---|
| Distribution | uniform | — |
| Particle size μm | 0.2–2.5 | — |
| Limit flexural stress mPa | 122 | 124 |
| Flexural E modulus mPa | 2.580 | 2.510 |
| Izod impact strength kj/m² | 30 | no break |
| Vicat softening temperature VST B °C. | 245 | 245 |
| Heat distortion temperature |  |  |
| ISO R 75 meth. a °C. | 79 | 77 |
| ISO R 75 meth. b °C. | 191 | 185 |

EXAMPLE 6 (COMPARISON)

A granule mixture of 90 parts polyamide 6 with a relative viscosity of 3.0 and 10 parts polyparaphenylene sulphide as in example 1 is compounded in a twin-screw extruder of the ZSK type from Werner and Pfleiderer at a material temperature of 280° C. The speed of rotation is 100 rpm and the throughput is 8 kg/hours. The resulting strand is inhomogeneous and contains specks of undissolved polyparaphenylene sulphide.

EXAMPLE 7 (COMPARISON)

A granule mixture of 90 parts polyamide 66 with a relative viscosity of 3.0 and 10 parts polyparaphenylene sulphide from example 4 is compounded in a twin-screw exruder as in example 6. The material temperature is 275° to 280° C. The extruded product is not homogeneous and contains specks of undissolved polyparaphenylene sulphide.

EXAMPLE 8 (COMPARISON)

90 parts of a copolyamide of adipic acid, terephthalic acid and hexamethylenediamine with a polyamide 66 content of 60 weight % and a relative viscosity of 3.1 and 10 parts by weight polyparaphenylene sulphide from example 5 are compounded as described in example 6. In deviation from this, the material temperature is 318° C.

A homogeneous-looking strand with a non-uniform distribution of the polyparaphenylene sulphide is obtained. Thin skins can be separated off from the surface of shaped articles of this product. The distribution of the polyparaphenylene sulphide inside the articles is non-uniform.

We claim:

1. A process for preparing a polymer mixture of polyamide and polyarylene sulphide with the polyarylene sulphide being discrete particles of 0.05 to 5 μm and the polyarylene sulphide content of the mixture being 0.1 to 40% by weight, said process comprising polymerizing polyamide precursors in the presence of a solution of polyarylene sulphide in the polyamide precursors wherein the polyamide precursors are an aminocarboxylic acid, a lactam or a mixture of a diamine and a dicarboxylic acid.

2. Process for the preparation of mixtures of polyamide and polyarylene sulphide according to claim 1 wherein the polyarylene sulphide is first dissolved in ε-caprolactam and the solution is then polymerized hydrolytically or anionically.

3. Process according to claim 2 wherein a mixture of ε-caprolactam and polyparaphenylene sulphide is heated at the beginning of the hydrolytic polymerization to 270°–290° C., and then the polymerization is completed at a lower temperature between 260° to 270° C.

4. Process according to claim 3 wherein the temperature at the beginning of polymerization is 275° to 280° C.

5. Process for the preparation of mixtures of polyamide and polyarylene sulphide according to claim 1 wherein poly-(p-phenylene sulphide) is the polyarylene sulphide.

* * * * *